(12) United States Patent
Dogon et al.

(10) Patent No.: US 10,255,232 B2
(45) Date of Patent: Apr. 9, 2019

(54) COMPUTER ARCHITECTURE WITH A HARDWARE ACCUMULATOR RESET

(71) Applicant: Mobileye Vision Technologies Ltd., Jerusalem (IL)

(72) Inventors: Gil Israel Dogon, Jerusalem (IL); Yosi Arbeli, Rishon Le-Zion (IL); Yosef Kreinin, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 15/726,410

(22) Filed: Oct. 6, 2017

(65) Prior Publication Data
US 2018/0095934 A1     Apr. 5, 2018

Related U.S. Application Data

(63) Continuation of application No. 15/002,718, filed on Jan. 21, 2016, now Pat. No. 9,785,609, which is a continuation of application No. 13/557,337, filed on Jul. 25, 2012, now Pat. No. 9,256,480.

(51) Int. Cl.
| | |
|---|---|
| G06F 11/30 | (2006.01) |
| G06F 9/38  | (2018.01) |
| G06F 9/30  | (2018.01) |
| G06F 15/82 | (2006.01) |
| G06F 9/54  | (2006.01) |
| G06K 9/00  | (2006.01) |
| G06F 9/32  | (2018.01) |
| G06F 9/345 | (2018.01) |

(52) U.S. Cl.
CPC .......... *G06F 15/82* (2013.01); *G06F 9/3001* (2013.01); *G06F 9/30029* (2013.01); *G06F 9/325* (2013.01); *G06F 9/345* (2013.01); *G06F 9/3836* (2013.01); *G06F 9/3885* (2013.01); *G06F 9/542* (2013.01); *G06F 11/30* (2013.01); *G06K 9/00791* (2013.01)

(58) Field of Classification Search
None
See application file for complete search history.

(56) References Cited

U.S. PATENT DOCUMENTS

| | | | | |
|---|---|---|---|---|
| 5,659,690 | A * | 8/1997 | Stuber | G06F 13/385 710/307 |
| 5,673,407 | A * | 9/1997 | Poland | G06F 5/012 712/20 |
| 6,023,759 | A * | 2/2000 | Omtzigt | G06F 9/30003 712/227 |
| 6,151,682 | A * | 11/2000 | van der Wal | G06F 1/10 327/149 |
| 6,658,578 | B1 * | 12/2003 | Laurenti | G06F 5/01 712/244 |
| 2005/0275428 | A1 * | 12/2005 | Schlacter | H03K 19/17728 326/41 |

(Continued)

*Primary Examiner* — Michael Sun
(74) *Attorney, Agent, or Firm* — Reches Patents

(57) ABSTRACT

A processor with an accumulator. An event is selected to produce one or more selected events. A reset signal to the accumulator is generated responsive to the selected event. Responsive to the reset signal, the accumulator is reset to zero or another initial value while avoiding breaking pipelined execution of the processor.

11 Claims, 7 Drawing Sheets

(56) References Cited

U.S. PATENT DOCUMENTS

| | | | |
|---|---|---|---|
| 2006/0015701 A1* | 1/2006 | Hogenauer | G06F 15/8007 712/11 |
| 2008/0141013 A1* | 6/2008 | Klima | G06F 9/325 712/241 |
| 2012/0216012 A1* | 8/2012 | Vorbach | G06F 8/443 712/11 |
| 2014/0189287 A1* | 7/2014 | Plotnikov | G06F 9/30145 712/3 |
| 2017/0220345 A1* | 8/2017 | Woo | G06F 9/3001 |

* cited by examiner

COMPUTER ARCHITECTURE WITH A HARDWARE ACCUMULATOR RESET

BACKGROUND

1. Technical Field

The present invention relates to computer architecture.

2. Description of Related Art

During the last few years camera based driver assistance systems (DAS) have been entering the market; including lane departure warning (LDW), Automatic High-beam Control (AHC), pedestrian recognition, and forward collision warning (FCW). These driver assistance systems may use real time image processing of multiple patches detected in multiple image frames captured from a camera mounted in a vehicle.

Reduced instruction set computing is a processor design strategy based on a simplified instruction set and may provide higher performance if the simplicity enables much faster execution per instruction. A processor architecture based on this strategy is known herein as a reduced instruction set computer (RISC).

A vector processor, or array processor, is a processor that implements an instruction set containing instructions that operate on one-dimensional arrays of data called vectors. A scalar processor in comparison operates on a single datum. Most commonly used processors are scalar processors.

VLIW (Very Long Instruction Word) digital signal processing units contain several sub-processing units which operate in parallel. The VLIW contains multiple op-codes which direct the various sub-processing units, thus allowing for parallel processing since each sub-unit gets its op-code at the same time. An op-code is a portion of a machine language instruction that specifies an operation to be performed.

BRIEF SUMMARY

Thus, various embodiments of the present invention aim to reduce calculational overhead of image processing algorithms which may be used for instance in driver assistance systems.

Various methods are provided performable by a processor including an accumulator. Multiple events may be generated by the address generation unit (AGU), zero overhead loop circuit or other hardware circuit. An event is selected to produce one or more selected events. A reset signal to the accumulator is generated responsive to the selected event. Responsive to the reset signal, the accumulator is reset to zero or another initial value while avoiding breaking pipelined execution of the processor.

The events may be stored in an event register. The selection of the selected event may be performed by logically ANDing a first input from the event register with a second input from an event selection register to produce a first AND output including first multiple outputs. The first multiple outputs are logically ORed together to produce a first OR output. The reset signal to the accumulator is generated responsive to the first OR output.

The first OR output may be stored in a shift register. An output from the shift register is logically ANDed with an output of a stage selection register to produce a second AND output. The second AND output includes second multiple outputs. The stage selection register may specify a number of cycles after an event occurs for performing the reset. The second multiple outputs may be logically ORed together to produce a second OR output. The reset signal to the accumulator may be generated responsive to the second OR output. Multiple image patches may be input by an address generation unit (AGU) attached to the processor. The AGU may calculate memory addresses for the image patches. A processing loop for processing the image patches may be initiated. During the processing, the events are generated responsive to the memory addresses. While executing the processing loop, the accumulator may be reset responsive to the selected event. A number of cycles after the selected event may be specified. The reset of the accumulator may be generated after the specified number of cycles. After said at least one selected event, multiple numbers of cycles may be specified, e.g. a first number of cycles and a second number of cycles and resets of said accumulator may be generated after both the specified first number and second numbers of cycles.

Various methods are provided performable by a system including a camera adapted to capture multiple image frames. The system includes a processor with an accumulator. Multiple image patches from the image frames are input. A processing loop for processing the image patches is initiated. The accumulator is reset while executing the processing loop and breaking pipelined execution of the processor is avoidable. The processing of the image patches may be over multidimensional zero-overhead loops.

Various systems are provided including a processor with an accumulator. Logical circuitry selects an event to produce one or more selected events. The logical circuitry generates a reset signal to the accumulator responsive to the selected event. Responsive to the reset signal, the logical circuitry resets the accumulator to zero or another initial value while avoiding breaking pipelined execution of the processor. An address generation unit (AGU) may be attached to the processor, The events may generated by the address generation unit (AGU). A system may include a first address generation unit and a second address generation unit each configured to generate events. The first logical circuitry may receive the events generated by the first and second address generation units. A second logical circuitry may receive the events generated by the first and second address generation units. A first accumulator may connect to said first logical circuitry and a second accumulator may connect to said second logical circuitry. Responsive to the events, the first logical circuitry is configured to reset the first accumulator and the second logical circuitry is configured to reset the second accumulator.

The events may be stored in an event register. The selection of the selected event may be performed in a logical AND gate by logically ANDing with a first input from the event register and with a second input from an event selection register to produce a first AND output including first multiple outputs. In a logical OR gate, the first multiple outputs are logically ORed together to produce a first OR output. The reset signal to the accumulator may be generated responsive to the first OR output.

The first OR output may be stored in a shift register. The shift register may include bits which are shiftable to enable a history of cycles to be kept. An output from the shift register is logically ANDed with an output of a stage selection register to produce a second AND output. The second AND output includes second multiple outputs. The stage selection register is used by software of the processor to specify the number of cycles after an event is generated by the AGU to generate a reset of said accumulator.

The second multiple outputs may be logically ORed together to produce a second OR output. The reset signal to the accumulator may be generated responsive to the second OR output. The first and second OR outputs may be single bit outputs.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
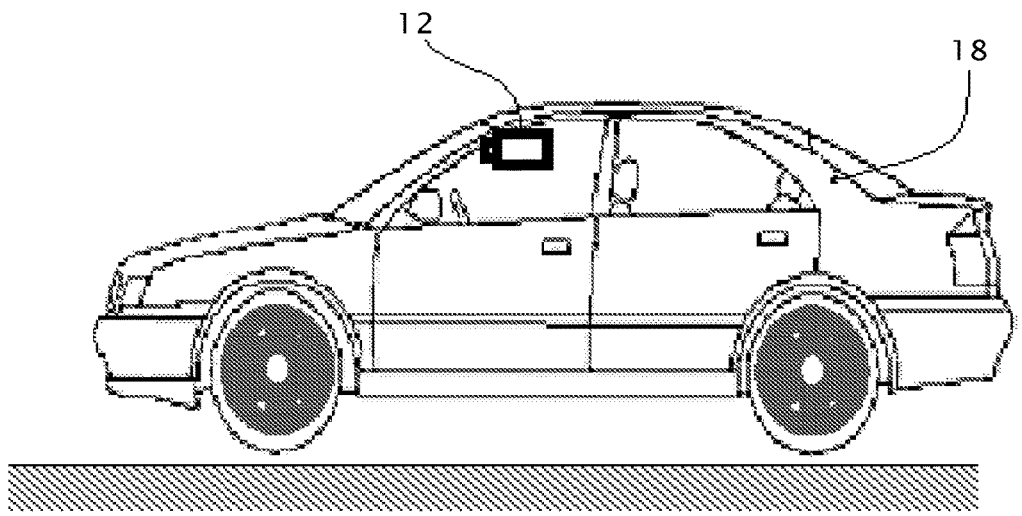
FIGS. 1 and 2 illustrate a system including a camera or image sensor mounted in a vehicle, according to an aspect of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

Embodiments of the present invention are applicable to processors designed for driver assistance systems, and other applications in digital processing for instance other image processing applications and/or audio processing applications.

By way of introduction, the basic concept of pipelined processing is to divide instruction execution into stages that operate independently. In pipelined execution, instructions may pass through the same stages as in an assembly line. With each new processor cycle, a new piece of data may be added to one end of the pipeline and a completed result may be retired out of the other end of the pipeline. Embodiments of the present invention are directed reducing calculational overhead with the use of digital logic circuitry for resetting an accumulator of a processor in real time. Resetting accumulators may be performed while executing a loop in hardware while avoiding breaking out of pipelined execution.

The terms "pipelining", "pipelined processing" "pipelined execution as used herein refers to a technique used in advanced microprocessors in which the processor begins executing a second instruction before the first has been completed. That is, several instructions are in the pipeline simultaneously, each at a different processing stage. The pipeline may be divided into segments and each segment may execute its operation concurrently with other segments. When a segment completes an operation, the result is passed to the next segment in the pipeline and the next operation is fetched from the preceding segment. The terms "pipelining" and "pipelined processing" and "pipelined execution" are used herein interchangeably.

The resetting of accumulators according to aspects of the present invention may find use in zero-overhead loops for given small/narrow image patches (from captured image frames) that are common in computer vision systems such as driver assistance systems (DASs). The resetting of accumulators may prevents the need to break out of a multidimensional zero-overhead loops (ZOLs) (or break pipelining) "just" to reset an accumulator. The resetting of accumulators according to embodiments of the present invention typically may expand the utility of multidimensional ZOLs.

The terms logical "AND", "ANDing" or "ANDed" as used herein refer to the function of a digital AND gate which logically ANDs together variables at the input to give at least one variable at the output.

The terms logical "OR", "ORing" or "ORed" as used herein refer to the function of a digital OR gate which logically ORs together variables at the input to give at least one variable at the output.

Definition of "Accumulator"

Basically, in the context of accumulator reset according to features of the present invention, the term "accumulator" as used herein is a device which maintains a state. The state may be updated by an "accumulation instruction", which, in turn, is any instruction which functionally performs as:

state=function (state, inputs)

The most common accumulation function is addition: state=state+input

Vector accumulation may be reducing, non-reducing, or cumulative:

```
state = state + sum(input_vector) # reducing – 8+1 arguments, 1 result
for i=0:8, state_vector[i] = state_vector[i] + input_vector[i] #
non-reducing – 8+8 arguments, 1 result
prev_sum=state_vector[7]; for i=0:8, state_vector[i] = prev_sum +
sum(input_vector for 0 to i) # cumulative
```

Another interesting case is when the function is other than/addition:

```
state = min(state,input)
state = max(state,input)
for i=0:8,
    state_histogram[input_index[i]] =
        state_histogram[input_index[i]] + input_weight[i]]
```

All these examples herein above are "accumulators" in the sense that accumulator resets according to different features of the present invention may be applied to the accumulators.

"Pipelining" in General Versus "Software Pipelining" in VLIW Machines

In general, accumulator reset according to features of the present invention may not be particularly useful on any processor just because the processor is pipelined. For example, consider the loop:

```
for y=0:H {
    acc=0
    for x=0:W {
        acc+=img(x,y)
    }
}
```

On a pipelined RISC processor, resetting the accumulator in software creates an overhead, but a relatively small one:

```
YLOOP:
SET ACC,0
XLOOP:
LOAD R0,img_next_addr //it would be more instructions, but let's
ignore it here
ADD ACC,R0
BEQ X,W, XLOOP //end XLOOP
BEQ Y,H, YLOOP
```

Suppose W=8 which means that every 8 iterations, one instruction is spent—SET ACC,0—to reset the accumulator. If every iteration costs 3 instructions—LOAD, ADD, BEQ—that is 1 instruction of "overhead" for 24 instructions of "useful work"—not that much. Furthermore, it does not matter much whether the processor is pipelined or not, at least it does not matter in any straightforward way. A pipelined RISC processor will or at least could execute all these instructions in a pipelined fashion—whether there is a SET ACC, 0 instruction occasionally being executed or not.

The overhead is much larger on VLIW machines, however, and not because of pipelining in general, but because of, specifically, software pipelining. On a VLIW machine, the loop would look like this:

```
YLOOP:
SET ACC,0    //X loop header assuming LOAD latency is 2 cycles, so we
             can't ADD anything for the first 2 cycles
LOAD R0,img_next_addr
LOAD R0,img_next_addr
XLOOP:
LOAD R0,img_next_addr *AND IN PARALLEL* ADD ACC,R0//X
loop trailer handle values loaded by the last 2 loads
ADD ACC,R0
ADD ACC R0
```

On VLIW machines, pipelining is handled differently than, say, on RISC machines. Specifically, pipelining effects are visible to software: on a RISC machine, all instructions following LOAD R0. . . can assume R0 has the new value—not so on VLIW, where the ADD using the result of the LOAD should be placed two instructions down the road. The result of the LOAD placed two instructions down the road, has the benefit of simplifying hardware: a VLIW processor can issue multiple instructions at the same cycle— like in the example above, where LOAD and ADD are done, in the loop though not in the header or the trailer, simultaneously. A RISC processor can also place the result of the load two instructions down the road—super-scalar/out-of-order processors with RISC instruction sets do this but the cost is relatively complicated hardware mechanisms that analyze, at run-time, the dependencies between the instructions that RISC processors execute in order to figure out how to run the instructions in parallel, and whether it is at all logically possible to run the instructions in parallel.

The upshot is that VLIW with ZOLs, speed up the innermost loops significantly—there's one instruction instead of 3 or more—without complicating the hardware (as does a super-scalar processor that could actually run 3 instructions, or more, in parallel).

Now consider the overhead of resetting an accumulator on a VLIW machine compared to a single-issue RISC machine. Not only is one cycle per every 8 instructions paid—⅛ is more than 1/24—but a price is also paid for the header and the trailer. In our example, that is 2 cycles for the header and 2 cycles for the trailer—overall, 5 (1+2+2) cycles of overhead for 8 cycles of useful work.

Therefore, accumulator reset according to features of the present invention is particularly advantageous on a VLIW processor.

Figure 2:
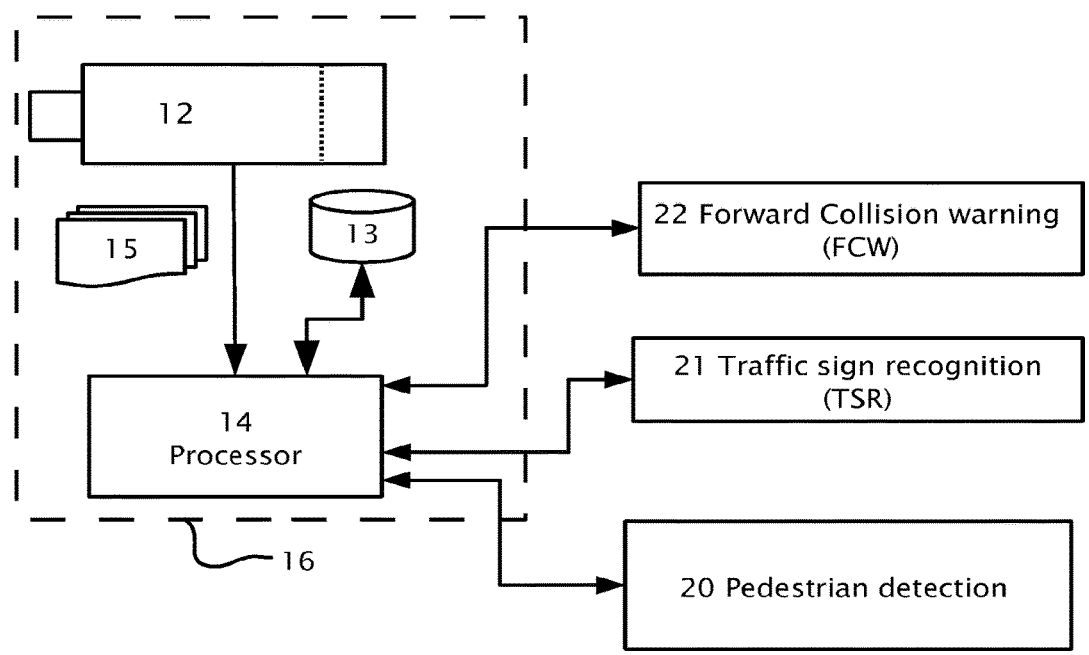

Reference is now made to FIGS. 1 and 2 which illustrate a system 16 including a camera or image sensor 12 mounted in a vehicle 18, according to an aspect of the present invention. Image sensor 12, imaging a field of view in the forward direction provides image frames 15 in real time and image frames 15 are captured by an image processor 14. Image processor 14 may be used to process image frames 15 simultaneously and/or in parallel to serve a number of driver assistance systems/applications. The driver assistance systems may be implemented using specific hardware circuitry with on board software and/or software control algorithms in storage 13. Image sensor 12 may be monochrome or black-white, i.e. without color separation or image sensor 12 may be color sensitive. By way of example in FIG. 2, image frames 15 are used to serve pedestrian detection 20, traffic sign recognition (TSR) 21 and forward collision warning (FCW) 22. Image processor 14 is used to process image frames 15 to detect and recognize an image or portions of the image in the forward field of view of camera 12.

Driver assistance systems may further include lane departure warning systems and headlight control systems. Most driver assistance applications require processing over multiple windows of a single frame and/or multiple image frames. In some cases, image frames 15 are partitioned between different driver assistance applications and in other cases the image frames 15 are shared between the different driver assistance applications.

Figure 3:
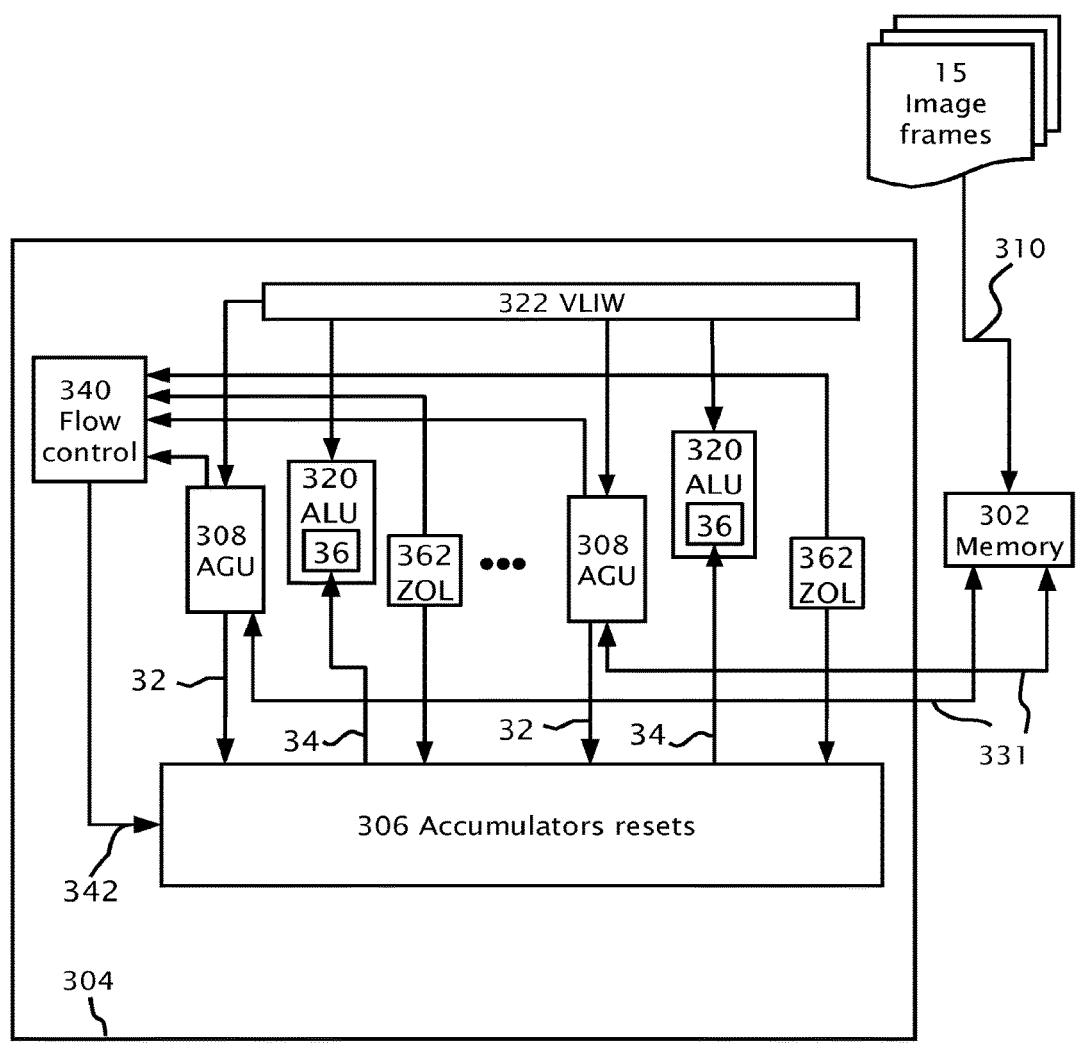
FIG. 3 illustrates a system block diagram for an image processing system, according to an embodiment of the present invention.

Reference is now made to FIG. 3 which illustrates a system block diagram for an image processing system 30 according to an embodiment of the present invention. Image processing system 30 includes a vector processor 304 and a memory 302. Memory 302 connects to an input of multiple image frames 15 via an image frame bus 310. Vector processor 304 includes multiple arithmetic logic units (ALU) 320 and multiple address generators 308 which connect to multiple accumulators resets 306 via event line 32. Multiple zero overhead (ZOL) modules 362 are connected to flow control 340 and multiple accumulators resets 306. Address generators 308 connect to memory 302 with a memory bus 331. Address generators 308 also connect to flow controller 340 which provides a flow control line 342 to multiple accumulators resets 306. Arithmetic logic units (ALU) 320 and address generator 308 connect to a very long instruction word (VLIW) instruction register 322 via their own separate buses (thus allowing simultaneous execution of the relevant op-codes. ALUs 320 have accumulators 36 which are resettable via accumulators resets 306 through accumulator reset line 34.

With traditional DSP-style zero-overhead loops (ZOLs), a machine repeatedly runs a piece of code, decrementing a counter until the counter becomes zero. At first glance, the counter works with rectangles from image patches or 1 dimensional (1D) arrays. Suppose a 1D array of size N takes N/8 iterations to process as may take place on a single instruction multiple data (SIMD) machine processing 8 data items at a time for example. So the ZOL counter is set to N/8. For a 2D rectangle of width W and height H, W*H/8 iterations are needed. A question may arise as to why not set the counter to W*H/8, and use ZOL as with 1D arrays? An answer to the question is the possible problem in maintaining X & Y coordinates. With 1D arrays, there is a 1D coordinate called i that gets the values, assuming increments of 8:

```
i=0
i=8
...
i=N
```

With 2D coordinates, X and Y, every time the end of a rectangle's row is reached, there is a special case:

```
X=0, Y=0 //next, increment X...
X=8, Y=0 //next, increment X...
...
X=W, Y=0 //NOW, increment Y and reset X
X=0, Y=1 //next, increment X
...
X=W, Y=1 //NOW, increment Y and reset X
X=0, Y=1 //next, increment X
```

The special case is handled by special code in the program, so it may not be possible to just run the same code W*H/8 times using a ZOL iteration counter. Similar issues may occur with 3D arrays, 4D arrays, etc., which may mean only the innermost dimension can be implemented using a traditional DSP ZOL and the outer dimensions become regular loops. For example:

```
for Y: //regular loop
    for X: //a DSP-style ZOL
        body
    X=0, Y++ //special case
```

Or, with 3D data, and different nesting—X is the outermost loop:

```
for X: //regular loop
    for Y: //regular loop
        for Z: //a DSP-style ZOL
            body
        Z=0, Y++ //special case
```

Where the innermost dimension is implemented using a traditional DSP ZOL there may not be a problem when the innermost loop executes many times, but may become a problem when the inner loop executes just a few times. This way, the innermost loop is in fact "zero-overhead"—but the frequently executing outer loops are not zero-overhead. So there are significant overheads associated with breaking pipelined execution of the inner loops that traditional ZOLs with 1D data do not eliminate. These overheads are especially large for very large instruction word (VLIW) machines. SIMD and VLIW are basically orthogonal, there are SIMD VLIW machines, SIMD machines that are not VLIW, and VLIW machines that are not SIMD. Vector microcode processor (VMP) is both SIMD and VLIW, a prominent example of a SIMD VLIW machine is TI's C64 family for example.

In contrast to SIMD VLIW machines, vector processor 304 address generation units (AGUs) 308 allow use of a single ZOL by:

Taking care of the special case—end-of-innermost-dimension—automatically in hardware. Every time an AGU 308 is issued a "next" command, the hardware checks for end-of-dimension conditions.

Raising a "break out of the loop" signal for flow control unit 340 only at the end of the outermost loop (when so configured).

For example, a loop over 3D data can look like this:

```
my_iter=Iterator3D(base=..., xcount=..., ycount=..., zcount=...);
iterate { //a single ZOL
    data=my_iter.load( ); //takes care of end-of-dimension conditions,
    breaks when all data is processed
    ...
}
```

As explained above, it may be beneficial to stay inside a ZOL for as long as possible. An example of an overhead avoidable using a feature of the present invention is breaking out of a ZOL. Every time a break out occurs, loop trailer code is executed and every time a loop is re-entered, loop header code is executed by ZOL module 362.

AGUs 308 of vector processor 304 communications to flow control unit 340 are beneficial because their need to handle end-of-row conditions is eliminated. AGUs 308 of vector processor 304 communications to flow control unit 340 are beneficial also because the loop is entered and only quit at the end of the 2D region, not at the end of every row.

At the beginning of every row X is reset to its minimal coordinate and Y is incremented to the next row which may be handled by AGU 308 without needing to break out of the loop. We would, however, break out of the innermost loop over rows if something special is done at the beginning of every row. One of the most common things to be done at the beginning of rows is resetting an accumulator 36. For a simple example, consider a horizontal integral image where

```
out (x, y) = sum (in(1: x, y)):
    for y:
        acc = 0
        for x:
            acc += in(x,y) // acc:=acc+in(x,y)
            out(x,y) = acc
```

In this loop above, the same operation is done for all pixels in all rows, except for zeroing the accumulator 36 at the beginning. Therefore, if there is no accumulator reset, nested loops are used along the lines of:

```
iterate {
    A.reset( );
    iterate {
        in=in_iter.load( );
        low,hi=A.cumsum_8ub_8uh(in); //vectorized cumulative sum
        out_iter.store(low,hi);
    }
}
```

In vector processor 304, accumulator reset can be used to create a single loop:

```
iterate {
    in=in_iter.load( );
    low,hi=A.cumsum_8ub_8uh(in,acc_reset=(in_iter,i));
    out_iter.store(low,hi);
}
```

Vector processor 304 instructs the hardware to behave as follows. An event is signaled to the accumulator reset 306 every time the iterator in_iter reaches the end of its innermost loop (the loop over rows may be the innermost or it could be the loop over columns instead, depending on the programming of the iterator which is omitted from the example). Upon that event, the accumulator reset 306 zeros the accumulator 36 such that instead of updating the accumulator 36 as usual, the accumulator reset 306 resets the accumulator 36 and then updates the accumulator 36.

The description above is different from simply resetting the accumulator 36—that would be incorrect. For example, the need to compute the cumulative sum of the first 8 pixels in the row (just as well as the second 8-pixel tuple, then third, etc.), and resetting the accumulator 36 instead would get the first 8 pixels ignored. So accumulator reset 306 modifies the behavior of the cumsum instruction to the semantics, "reset the accumulator 36, then do your job as usual". This is also how the accumulator reset works with other accumulation instructions—plain vectorized accumulation, dimension-reducing accumulation, etc.]

Figure 4A:
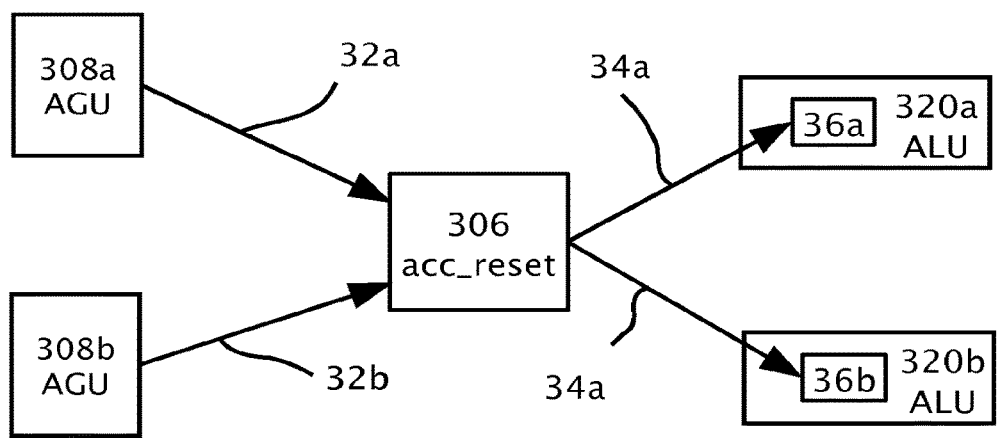
FIG. 4a illustrates a simplified system for resetting accumulators, according to a feature of the present invention.
Figure 4B:
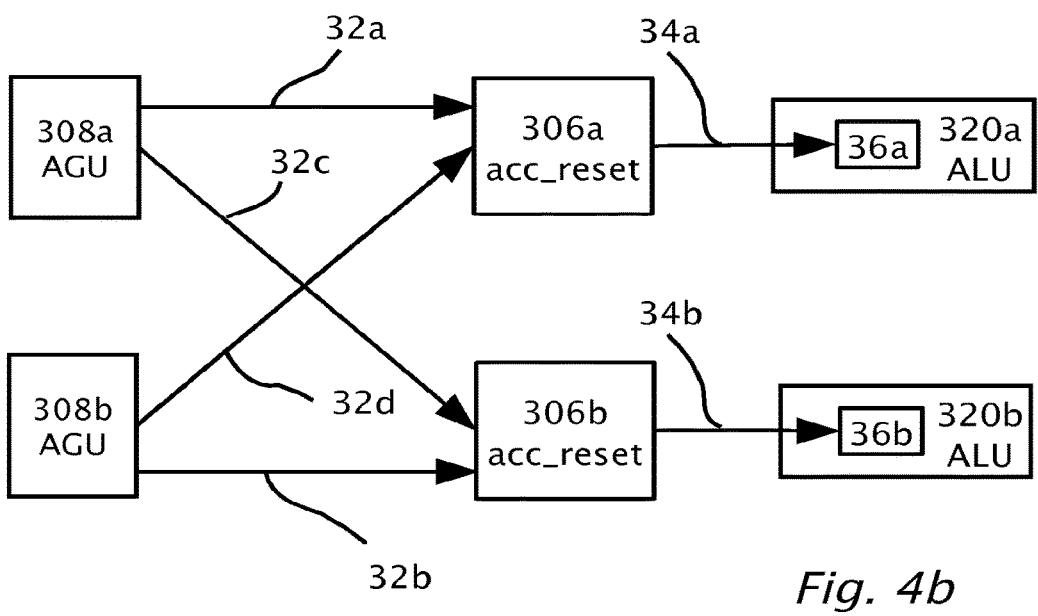
FIG. 4b illustrates another simplified system for resetting accumulators, according to a feature of the present invention.

Reference is now made to FIGS. 4*a* and 4*b* which show different signaling schemes using two accumulators (not shown each in ALU 320 and a single accumulator reset (acc_reset) 306, according to features of the present invention. The terms" accumulator reset 306 and logical circuitry 306 are used herein interchangeably.

Referring specifically to FIG. 4*a*, single accumulator reset (acc_reset) 306 may receive an event from AGU 308*a*, AGU 308*b* via respective event lines 32*a* or 32*b* and/or from multiple ZOL modules 362. In general the event comes from a place which is not the normally used instruction fetch/decode hardware. The event may occur at the beginning of a row, the end of a row or the last point in the image patches from captured image frames 15. The event typically encodes an AGU 308 number (so that an event can come from any of the 2 AGUs 308*a* or 308*b* used in this example found in vector processor 304) and the location in the 2/3/4D region of the image patches which upon reaching the event is signaled. The event can then be scheduled to provide a reset from accumulator reset 306 via reset lines 34 because some operations within vector processor 304 need the reset, some do not, and each operation happens at a different delay. Therefore at some point at a beginning-of-row or some other special iteration—and "at this point in time", an event is signaled that modifies the behavior of accumulator reset 306. In reality, however, the AGU 308 will reach that iteration earlier than the accumulator reset due to modulo scheduling. Modulo Scheduling, another name for pipelining, is a form of instruction scheduling that interleaves different iterations of a loop. Based on the event flow controller 340 enables the reset from accumulator reset 306 to be applied to either accumulator 36*a* of ALU 320*a* and/or accumulator 36*b* of ALU 320*b*.

In FIG. 4*b*, AGU 308*a* or AGU 308*b* may have events provided to accumulator resets 306*a* and 306*b* via event lines 32*a*, 32*b*, 32*c*, 32*d* and/or from multiple ZOL modules 362. Events from AGU 308*a* may be provided to accumulator resets 306*a* and/or 306*b*. Similarly events from AGU 308*b* may be provided to accumulator resets 306*a* and/or 306*b*. Resets from accumulator resets 306*a* and 306*b* via reset lines 34*a* and 34*b* respectively may be applied to respective accumulators 36*a* and 36*b* based on the events generated by AGU 308*a* and/or AGU 308*b*.

Figure 5:
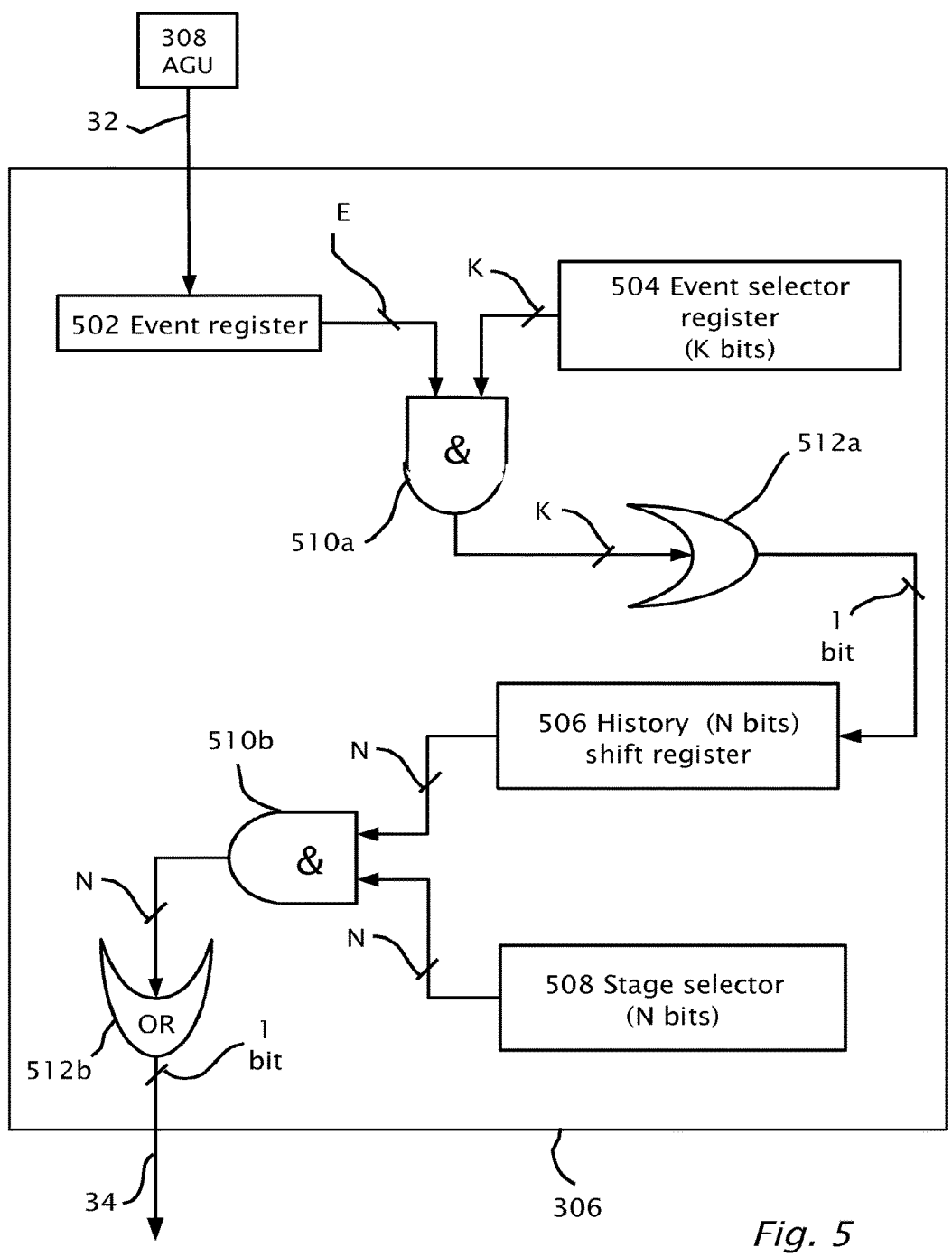
FIG. 5 shows a hardware implementation of an accumulator reset, according to a feature of the present invention.

Reference is now made to FIG. 5 which shows a hardware implementation of an accumulator reset 306, according to a feature of the present invention. A number of events 32 are input into event register 502. The output of event register 502 is E bits which correspond with the number of events 32 which is logically 'ANDed' together with the K bits of event selector register 504 via AND gate 510*a*. The K bit output of AND gate 510*a* is then inputted into OR gate 512*a*, where the K bits are ORed with each other, which gives a single bit output which is placed into history shift register 506. The N bit output of history shift register 506 is then 'ANDed' with the N bits of stage selector 508 via AND gate 510*b*. The N bit output of AND gate 510*b* is then input into the N bit input of OR gate 512*b*, where the N bits are ORed with each other to give a single bit output. The single bit output of OR gate 512*a* may be the accumulator reset 34 shown in the previous figures.

At this point in the explanation, the utility of the features of the present invention should be clear, as well as the general way to achieve the utility of the features of the present invention. In further detail, the core hardware mechanisms that make the utility of the features of the present invention actually work is shown below in the many different contexts where the features are useful. In particular, two things are taken into account:

Different event types. Vector processor 304 AGUs 308 support 2D, 3D and 4D regions. A programmer might want an accumulator to be reset, not necessarily at the beginning of every row, but at many kinds of special locations within the 2/3/4D region.

Scheduling delays. Logically, at some point at a beginning-of-row or some other special iteration—and "at this point in time", an event is signaled that modifies the behavior of the accumulator. In reality, however, the AGU 308 will reach that iteration earlier than the accumulator due to modulo scheduling. Furthermore, some operations need the reset, some do not, and each happens at a different delay.

Here is how the hardware described above and specifically hardware implementation of accumulator resets shown in FIG. 5 handles these concerns.

Different Event Types

In vector processor 304, a hardware register called event selector register 504 keeps an event number, so that an accumulator reset 306 responds to an event chosen by the programmer. The event number encodes the AGU 308 number (so that an event can come from any of the 4 AGUs 308 used in this example found in vector processor 304) and upon reaching the location in the 2/3/4D region an event is signaled. Specifically, vector processor 304 supports the following locations according to a list (the list could be extended—the locations were chosen based on the assumption that in vector microcode processor programs, these are the particularly useful locations):

In the list, bold names name location types, and non-bold i, z and w name internal AGU 308 counters corresponding to the current location. z is the location along the Z (3rd) region dimension, w is the location along the W (4th) region dimension, and i is the location of either the X (1st) or Y (2nd) dimension, depending on which of them is the innermost dimension—in a "for y {for x}" loop, i is the X dimension counter, and in a "for x {for y}" loop, i is the Y dimension counter.

i—This condition will raise iff (i==0 & z==0 & w==0)—that is, once every time i reaches 0 z—This condition will raise iff (z==0 & w==0)—that is, once every time z reaches 0 w—This condition will raise iff w==0—that is, once every time w reaches 0 iz—This condition will raise iff i==0—that is, when i reaches 0, through all z iterations zw—This condition will raise iff z==0—that is, when z reaches 0, through all w iterations The following pseudo-code illustrates when each of these events "fire" given an AGU 308 iterating over a 4D region such that X is the outermost dimension (it should be noted that AGUs 308 of vector processor 304 support either X or Y as their outermost region dimension, but not Z or W-Z is always nested in either X or Y, and W is always nested in Z; this explains why some of the obvious conditions that one could imagine are not available.)

```
void izw(int xcount, int ycount, int zcount, int wcount) {
    int x,y,z,w;
    for(x=0; x<xcount; ++x) {
        for(y=0; y<ycount; ++y) {
            for(z=0; z<zcount; ++z) {
                for(w=0; w<wcount; ++w) {
                    int i=y; //y is our inner dimension
                    printf("x=%d y=%d z=%d w=%d", x, y, z, w);
                    printf(i==0 && z==0 && w==0? " i": " ");
                    printf(z==0 && w==0? " z": " ");
                    printf(w==0? " w": " ");
                    printf(i==0? " iz": " ");
                    printf(z==0? " zw": " ");
                    printf("\n");
                }
            }
        }
    }
}
```

This will print, given counts of 2 for all dimensions:

```
x=0 y=0 z=0 w=0 i z w iz zw
x=0 y=0 z=0 w=1 iz zw
x=0 y=0 z=1 w=0 w iz
x=0 y=0 z=1 w=1 iz
x=0 y=1 z=0 w=0 z w zw
x=0 y=1 z=0 w=1 zw
x=0 y=1 z=1 w=0 w
x=0 y=1 z=1 w=1
x=1 y=0 z=0 w=0 i z w iz zw
x=1 y=0 z=0 w=1 iz zw
x=1 y=0 z=1 w=0 w iz
x=1 y=0 z=1 w=1 iz
x=1 y=1 z=0 w=0 z w zw
x=1 y=1 z=0 w=1 zw
x=1 y=1 z=1 w=0 w
x=1 y=1 z=1 w=1
```

Scheduling Delays

In order to handle scheduling delays, a way is to:

Keep a history of events—a reaction to events several cycles after they happened, at precisely the cycle required. The reaction is so that there are some accumulation operations that are reset during the iteration in question, and other operations that are not.

Specify which operations react to the events—along the lines of, "the first two operations issued during the iteration need not be affected, but the third and the fourth are". Specifying which operations react to the events may be performed using two registers, software-programmable stage selector register 508 and an internal, hardware-maintained history shift register 506.

History shift register 506 is a 32-bit shift register updated at every cycle as follows:

All bits are shifted to the left losing the most significant bit (MSB), so a history of at most 32 cycles is kept.

The least significant bit (LSB) is set to 1 if an AGU 308 issued a load/store command that incremented the counters of the AGU 308 such that a location was reached triggering the event type configured at event selector register 504.

The behavior of an accumulator reset 306 is modified to reset accumulator 36 if an accumulation command is issued at a cycle when stage selector 508 & history shift register 506 !=0. i.e. not equal to zero, that is, when a bit is set. Stage selector 508 is thus used by software to specify the one or more number or numbers of cycles at which, after an event happens, reset should occur—in the hypothetical example of "third and fourth instructions", 2 bits corresponding to the delay between those instructions and the AGU 308 load/store command triggering the event would be set. That is, bits 7 and 9 are set, assuming that the 3rd instruction is issued 7 cycles after the AGU 308 load/store command and the 4th instruction is issued 9 cycles after the AGU 308 command. Stage selector 508 may be configured to select several stages.

Accumulator reset is a feature further expanding the utility of multidimensional ZOLs. Also there are specific reasons for accumulator reset 306 to be more useful when compared to the average general-purpose processor or DSP accelerator. Accumulator reset is useful, very specifically, when the accumulators 36 of ALUs 320 are reset every time through very short loops. Vector processor 304 has more such cases than the average processor because of having to process narrow regions of interest and because of running deeply nested loops with very short innermost dimensions, such as loops to implement some forms of matrix multiplication and filtering.

Figure 6A:
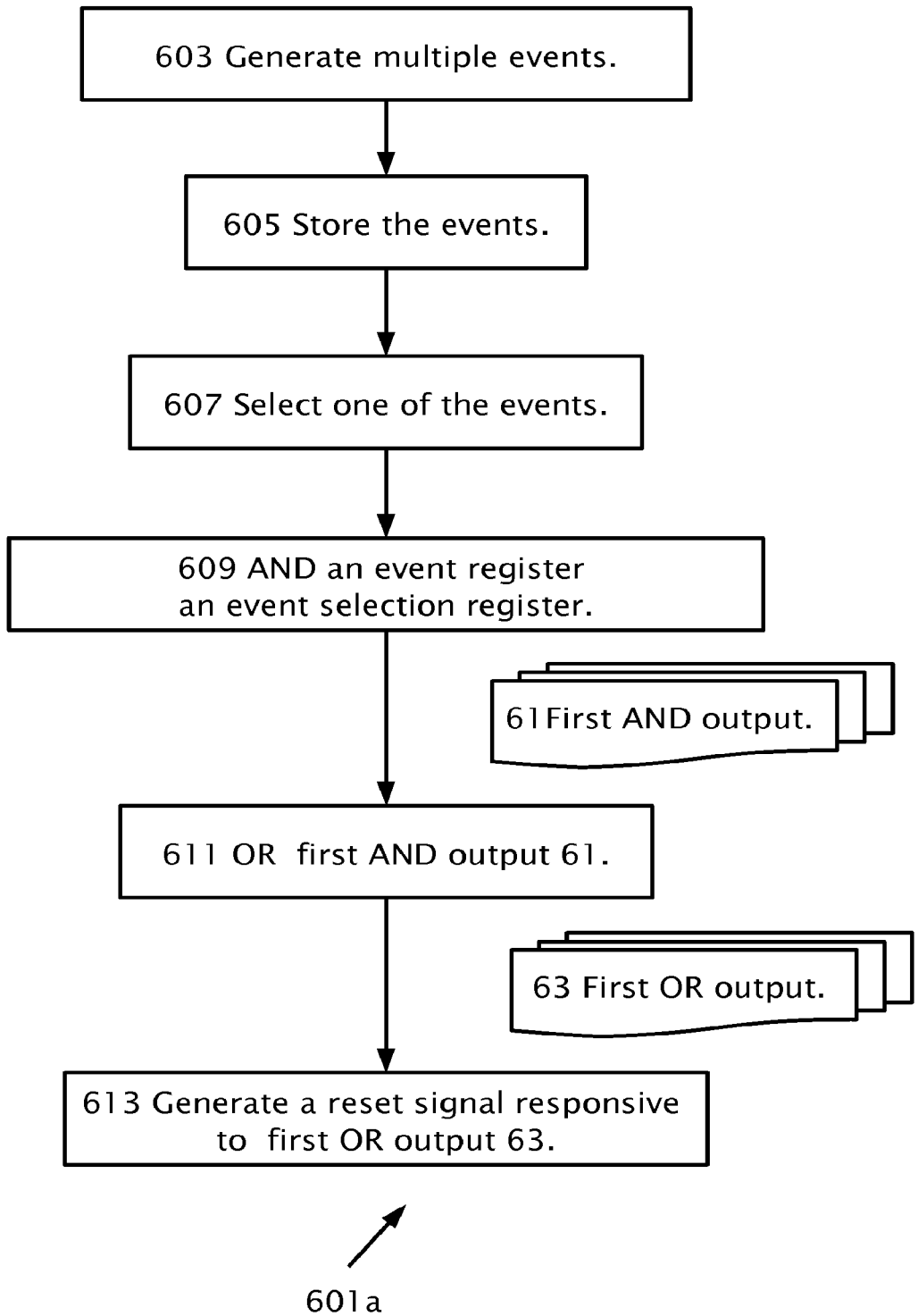
FIG. 6a shows a method and FIG. 6b which shows a method which may be a continuation of the method of FIG. 6a, according to a feature of the present invention.
Figure 6B:
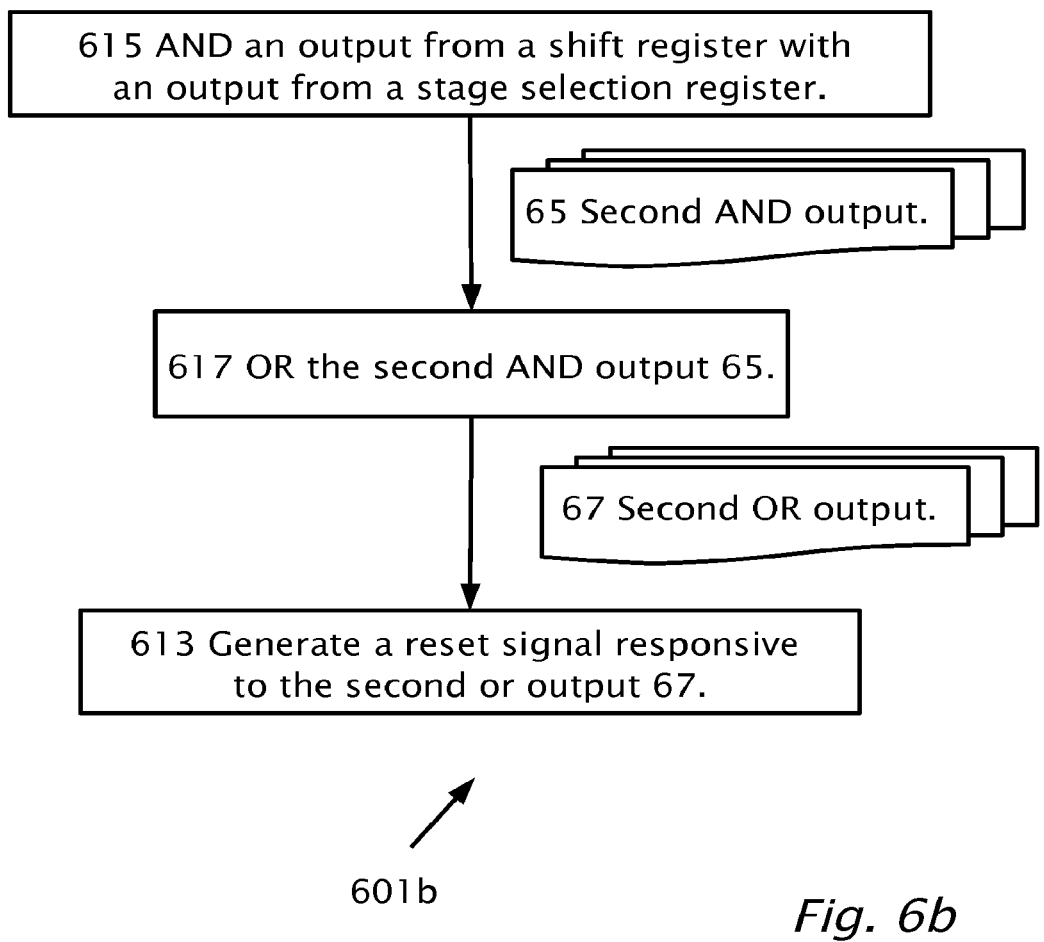

Reference is now made to FIG. 6a which shows a method 601a and FIG. 6b which shows a method 601b which may be a continuation of method 601a, according to a feature of the present invention. In step 603 multiple events may be generated by an address generation unit (AGU) 308 and/or ZOL module 362. The events generated by the AGU 308 and/or ZOL module 362 may be stored in memory 302 (step 605) or passed accumulator resets 306 by event lines 32. In step 607, at least one of the events generated AGU 308 and/or ZOL module 362 may be selected and number of events 32 from AGU 308 and/or ZOL module 362 are input into event register 502. The output of event register 502 is E bits which correspond with the number of events 32 which is logically 'ANDed' together with the K bits of event selector register 504 via AND gate 510a (step 609). The K bit output 61 of AND gate 510a is then inputted into OR gate 512b (step 611) which gives a single bit output 63 by virtue of the K bits ORed with each other. The single bit output 63 is placed into history shift register 506. The single bit output 63 of OR gate 512a may then be the basis for the accumulator reset 34 shown in the previous figures.

Where the single bit output 63 of OR gate 512a is not the basis for the accumulator reset 34 shown in the previous figures, the N bit output of history shift register 506 is then 'ANDed' with the N bits of stage selector 508 via AND gate 510b (step 615). The N bit output 65 of AND gate 510b is then input into the N bit input of OR gate 512b (step 617), where the N bits are ORed with each other to give a single bit output 67. The single bit output 67 of OR gate 512b may then be the basis for the accumulator reset 34 shown in the previous figures.

A simplistic implementation of steps 615 and 617 could have a constant delay (of 3 cycles for example), so there is no nee need for an AND and an OR in step 615 and 617 respectively. Rather, such an implementation would sample the event 3 times and use the oldest sample. A further simplification is not to have a history at all but rather reset the accumulator 36 immediately when the event arrives via event line 32. An event history could be kept, for example, at the AGU 308 side which would give the same accumulator reset 306 idea shown above. The constant delay may also be applied to steps 609 and 611.

Figure 7:
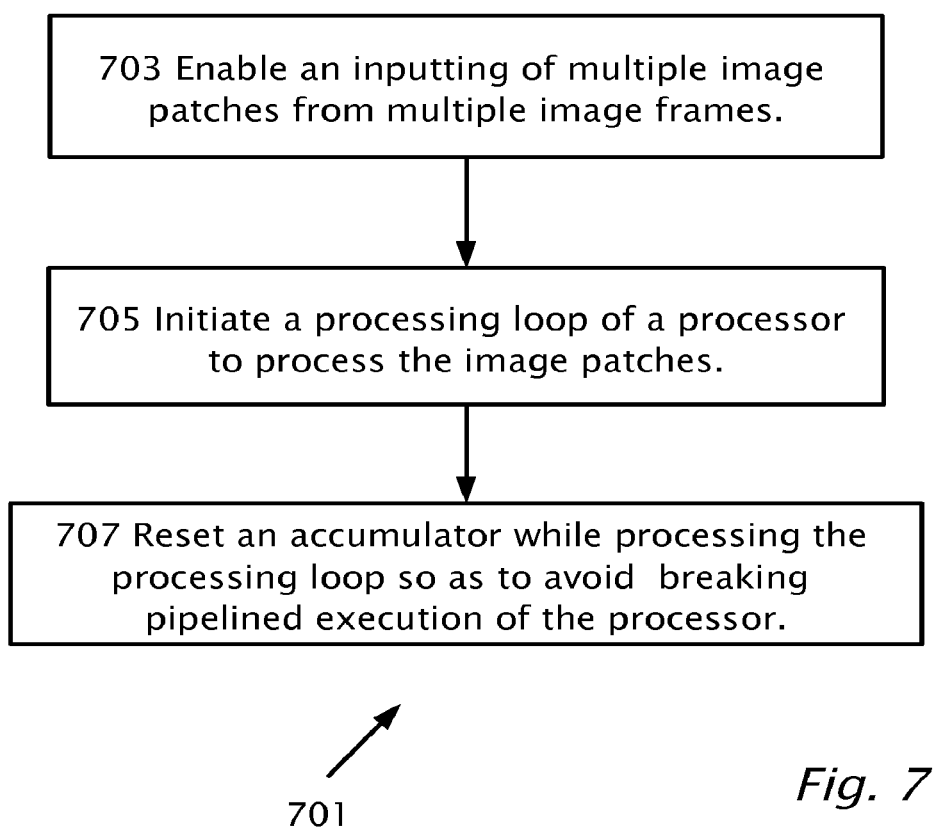
FIG. 7 shows a method, according to a feature of the present invention.

Reference is now made to FIG. 7 which shows a method 701, according to a feature of the present invention. As shown previously vector processor 304 includes multiple arithmetic logic units (ALU) 320 and multiple address generators 308 which connect to multiple accumulators resets 306 via event lines 32. In step 703 multiple image patches from image frames 15 are inputted into processor 304 via memory 302. In step 705 a processing loop for processing the image patches may be initiated. The processing of the image patches (step 705) may be over multidimensional zero-overhead loops (ZOLs) supervised by ZOL module 362. Resetting accumulator 36 (step 707), while processing the processing loop, avoids breaking pipelined execution of processor 304. The resetting of accumulator 36 in step 707, also avoids breaking out of the multidimensional zero-overhead loops (ZOLs).

The indefinite articles "a", "an" is used herein, such as "an output", "an AND gate have the meaning of "one or more" that is "one or more outputs" or "one or more AND gates".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

We claim:

1. A method performable by a processor, the method comprising:
executing by the processor multiple nested loops for scanning multiple dimensions of image patches; wherein the multiple nested loops comprises multiple innermost loops and outermost loops; wherein the processor comprises a flow control unit, multiple accumulators, multiple address generation units, and multiple zero overhead loop units;
wherein an execution of each nested loop of the multiple nested loop comprises:
checking, by a zero overhead loop hardware allocated to an execution of the nested loop, a fulfillment of an end of dimension condition that is indicative of an end of a scanning of a dimension of the multiple dimensions; wherein the zero overhead loop hardware differs from an address generation unit allocated to the execution of the nested loop;
sending a break out of nested loop signal to the flow control unit only at an end of an outermost loop of the nested loop; and
breaking out of the nested loop, by the flow control unit, responsive to the break out of nested loop signal.

2. The method of claim 1, wherein each nested loop comprises one or more intermediate loops; and wherein the method comprises avoiding breaking pipelined execution of the processor at an end of execution of each one of the one or more intermediate loops.

3. The method of claim 1, further comprising: executing, by the zero overhead loop hardware allocated to the execution of the nested loop, a loop trailer code when breaking out of the nested loop.

4. The method of claim 1, further comprising resetting an accumulator allocated to an execution of the nested loop following the breaking out of the nested loop.

5. A system comprising: a processor including multiple accumulators, a flow control unit, multiple address generation units, and multiple zero overhead loop units;
wherein the processor is configured to execute multiple nested loops for scanning multiple dimensions of image patches; wherein the multiple nested loops comprises multiple innermost loops and outermost loops;
wherein an execution, by the processor of each each nested loop of the multiple nested loop comprises:
checking, by a zero overhead loop hardware allocated to an execution of the nested loop, a fulfillment of an end of dimension condition that is indicative of an end of a scanning of a dimension of the multiple dimensions; wherein the zero overhead loop hardware differs from an address generation unit allocated to the execution of the nested loop;
sending a break out of nested loop signal to the flow control unit only at an end of an outermost loop of the nested loop; and
breaking out of the nested loop, by the flow control unit, responsive to the break out of nested loop signal.

6. The system of claim 5 wherein each nested loop comprises one or more intermediate loops; and wherein the processor is configured to avoid breaking pipelined execution of the processor at an end of execution of each one of the one or more intermediate loops.

7. The system of claim 5, wherein each zero overhead loop hardware that is allocated to the execution of the nested loop, is configured to execute a loop trailer code when breaking out of the nested loop.

8. The system of claim 5, comprising an accumulators reset unit that is configured to reset an accumulator allocated to an execution of the nested loop following the breaking out of the nested loop.

9. The system of claim 5 wherein each nested loop comprises one or more intermediate loops; and wherein the processor is configured to avoid breaking pipelined execution of the processor at an end of execution of each one of the one or more intermediate loops.

10. The system of claim 5, wherein each zero overhead loop hardware that is allocated to the execution of the nested loop, is configured to execute a loop trailer code when breaking out of the nested loop.

11. The system of claim 5, comprising an accumulators reset unit that is configured to reset an accumulator allocated to an execution of the nested loop following the breaking out of the nested loop.

* * * * *